Patented Oct. 11, 1927.

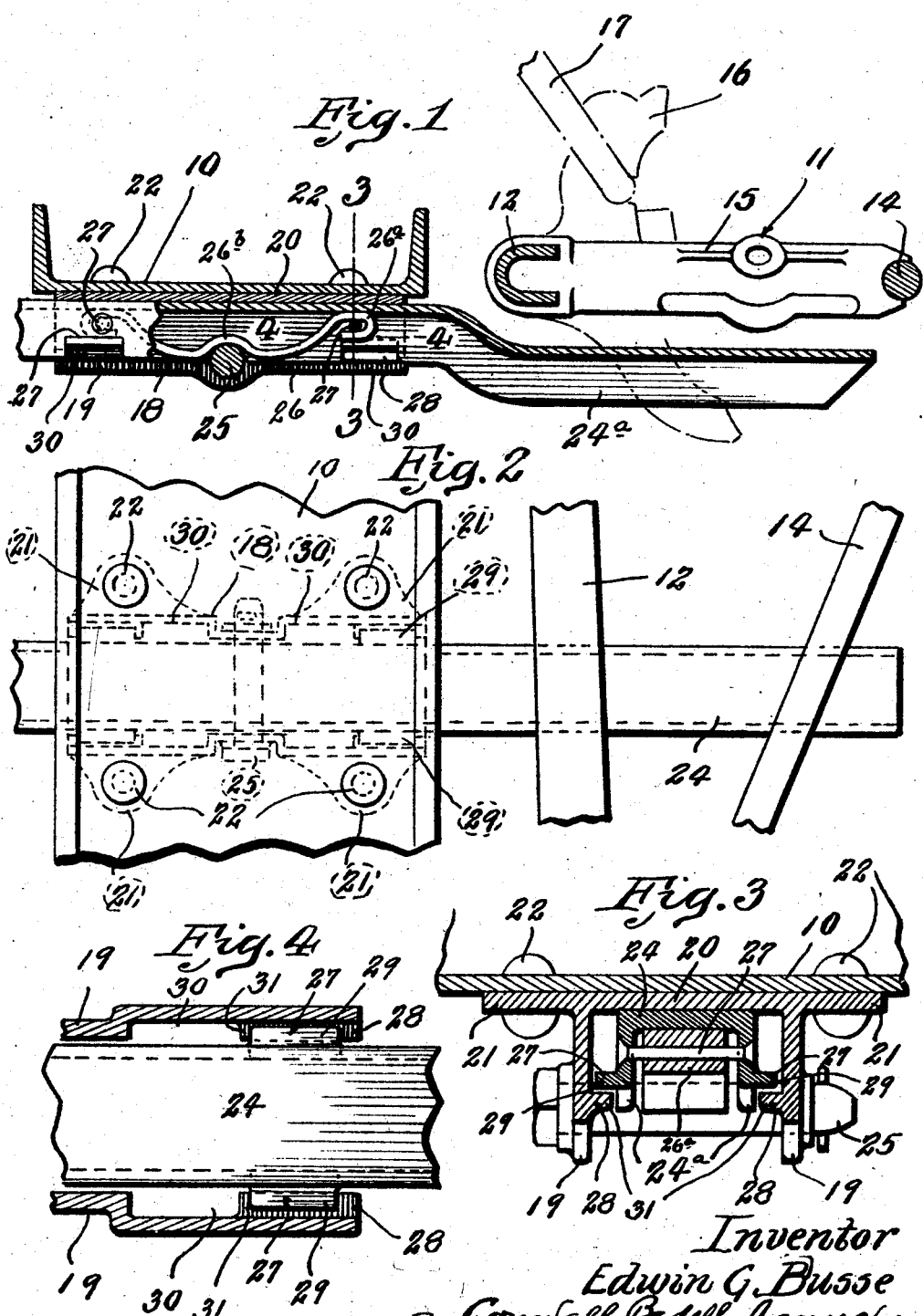

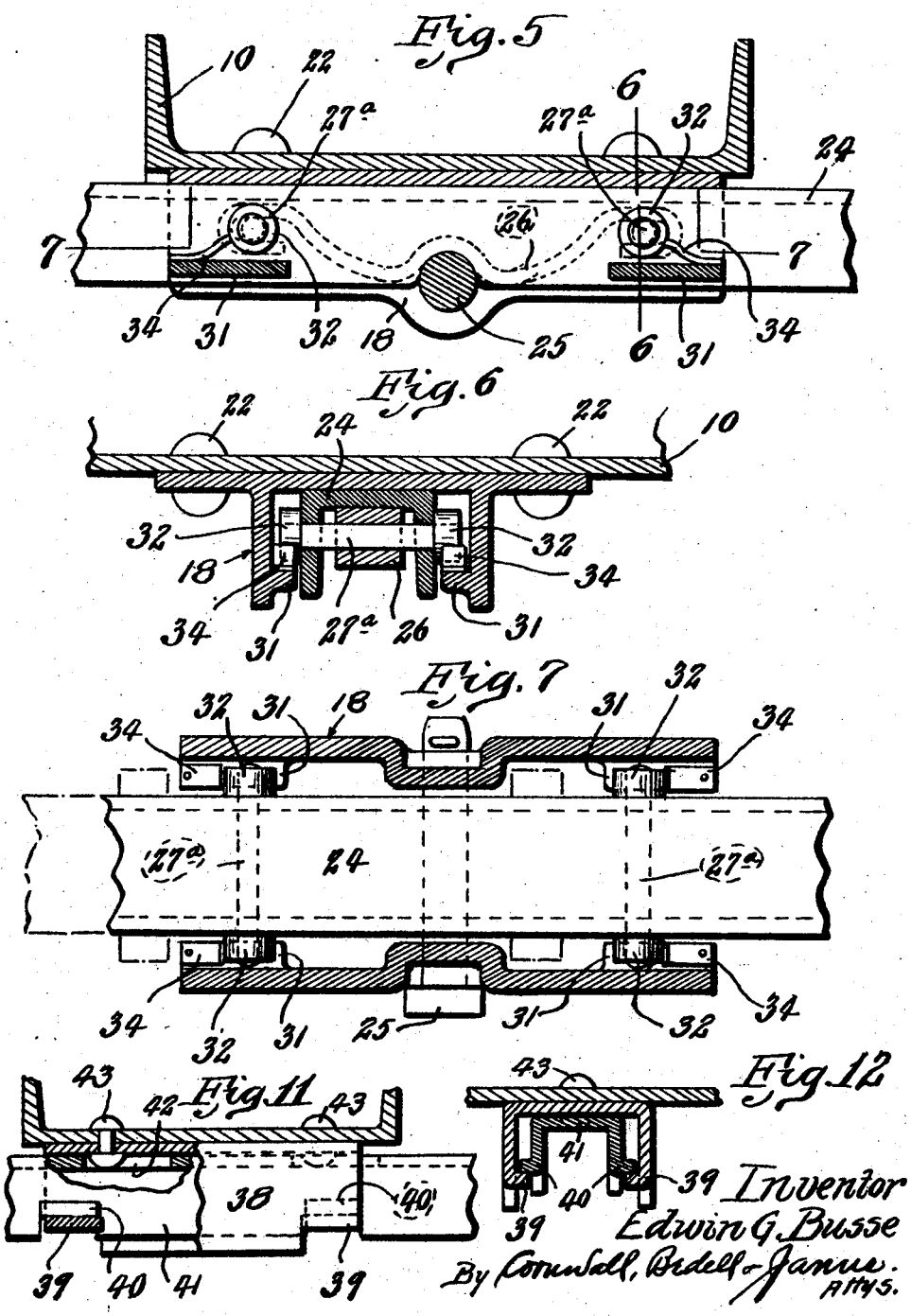

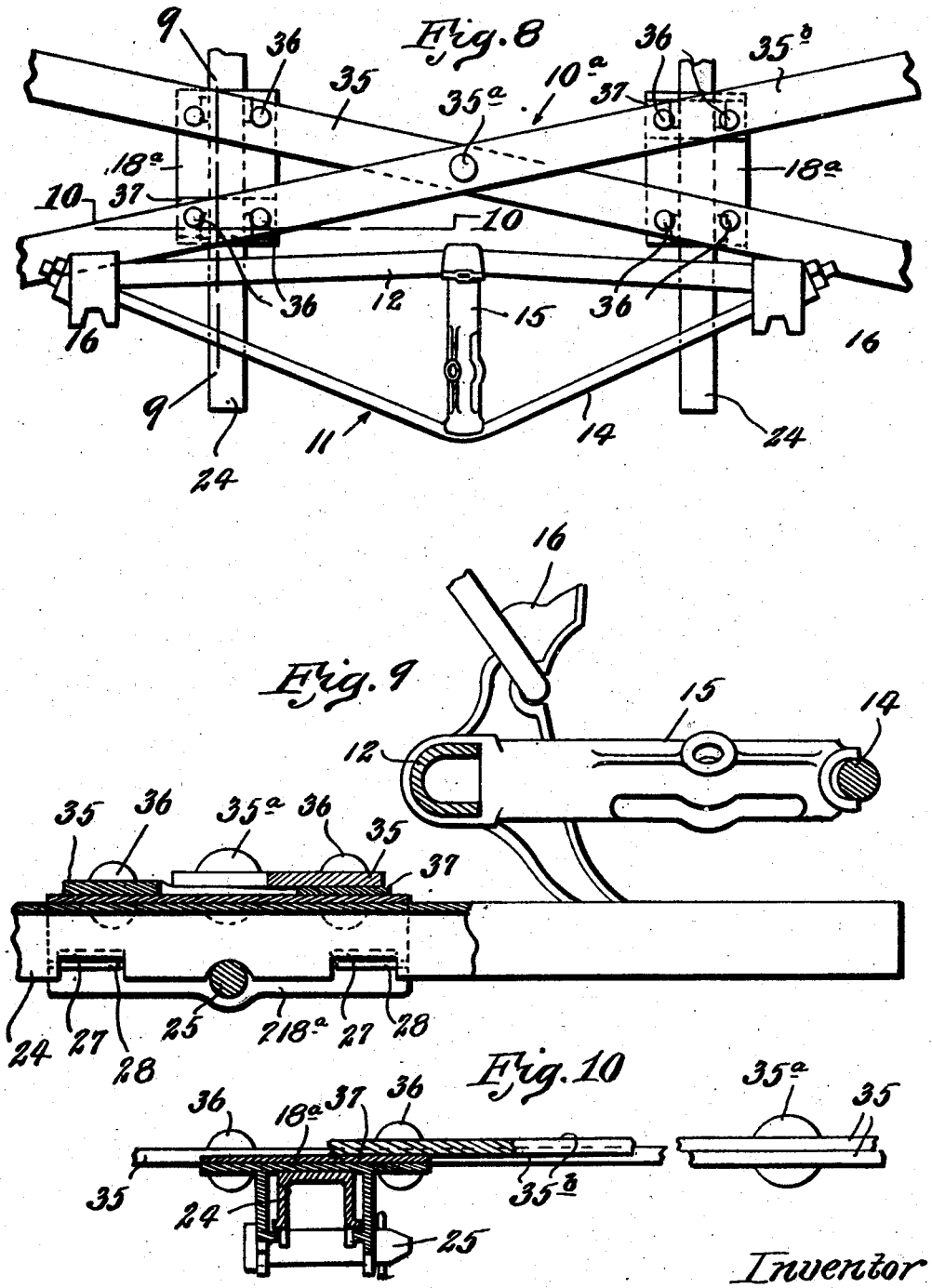

1,644,871

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

AUXILIARY SUPPORT AND GUARD FOR BRAKE BEAMS AND METHOD OF ASSEMBLING SAME.

Application filed October 26, 1925. Serial No. 64,997.

This invention relates to new and useful improvements in auxiliary supports or safety guards for brake beams and a new and useful method of assembling the same.

The objects of the invention are to provide a bracket having an open bottom whereby the safety bar can be inserted in position therein from below and to provide cooperating portions on said bracket and said safety bar, which portions are adapted to interengage and hold said safety bar in position in said bracket.

Further objects of the invention are to construct a bracket and a safety bar whereby said bar can be placed in position from below in a displaced position with respect to said bracket and then moved longitudinally in proper position to bring said bar in supporting engagement with said bracket, and to provide means for locking said bar against longitudinal movement when in assembled position in said bracket.

With these and other objects in view, my invention consists in certain novel features of construction and arrangement of parts, hereinafter more fully described and claimed, and illustrated in the accompanying drawings, in which—

Figure 1 is a side elevational view of the safety bar with the bracket and the spring plank shown in cross section.

Figure 2 is a top plan view of Figure 1.

Figure 3 is a vertical cross section taken on line 3—3 of Figure 1.

Figure 4 is an enlarged horizontal cross section taken on line 4—4 of Figure 1.

Figure 5 is an enlarged cross section through the bracket and the spring plank showing a modified form of safety bar.

Figure 6 is a vertical cross section taken on line 6—6 of Figure 5.

Figure 7 is a horizontal cross section taken on line 7—7 of Figure 5.

Figure 8 is a top plan view of a modified form of spring plank showing the safety bars supported by said spring plank underlying a brake beam.

Figure 9 is a vertical section taken on line 9—9 of Figure 8.

Figure 10 is a vertical cross section taken on line 10—10 of Figure 8.

Figure 11 is a side elevational view, partly in section, of a modified form of the invention.

Figure 12 is a transverse section.

In some car truck structures, it is desirable to insert the safety bar in the supporting bracket from below instead of longitudinally through the bracket. In such cases, the bracket is left open at the bottom and the safety bar is supported therein by a pin or pins transversely supported in the side walls of the bracket and engaging the underside of the safety bar. In the present invention, I provide additional supporting means for permitting assembly of the safety bar and hold the latter in position in readiness for the reception of the transverse pin.

Referring by numerals to the accompanying drawings, 10 indicates a spring plank, 11 a brake beam which, in the present instance, comprises a compression member 12, a tension member 14, and strut 15. A brake head 16 is supported on each end of the brake beam and engaging said brake head is a brake hanger 17. A bracket or mounting 18 is secured to the underside of spring plank 10 and this bracket is preferably of inverted U-shape in cross section having vertically disposed side walls 19, top wall 20, and horizontally disposed laterally projecting flanges 21 which are apertured for receiving suitable fastening devices 22 by means of which bracket 18 is fixed to the spring plank.

A safety bar 24 extends longitudinally between the side walls 19 and is held in position therein by a pin 25 which is seated in side walls 19 and extends transversely of said bracket. This pin engages downwardly presented seats or recesses formed in the downwardly presented edges of flanges 24$^a$, thereby locking said bar against longitudinal movement at the same time supporting said bar in position in said bracket.

A resilient member 26 is arranged longitudinally in bar 24 and has its ends movably mounted in said bar by means of pins 23 which are seated in the flanges of said bar and are movably engaged by the hooked ends 26$^a$ of spring member 26. The intermediate portion of spring member 26 is curved downwardly and is provided with a centrally disposed upwardly curved portion 26$^b$ which forms a transversely disposed concave seat adapted to be engaged by pin 25. Normally said central portion occupies a position spaced outwardly with respect to the axis of the aperture receiving pin 25. Thus when pin 25 is inserted in position, said central portion is forced upwardly and inwardly, thereby stressing said member 26 and increasing the tension thereof so that bar 24 is held under spring pressure in bracket 18 and any vibration or rattling of the bar is absorbed by said spring.

In order to enable the positioning of bar 24 in the bracket, before pin 25 is driven in position, bar 24 is provided with suitable lateral projections 27 disposed on each side of said bar and adapted to engage lateral projections or seats 28 projecting inwardly from the side walls 19 of bracket 18.

In the form shown in Figures 1 to 4, projections 27 are formed by bending outwardly portions of flanges 24$^a$ to form horizontally disposed outwardly projecting tongues 29. Side walls 19 are provided with pockets 30 within which project horizontally disposed ribs 31 formed integral with said side walls. These ribs are adapted to receive tongues 29 and support bar 24 in position. The length of pockets 30 is greater than the combined length of tongues 29 and ribs 31 so that sufficient clearance is provided between said tongues and said ribs in assembling bar 24.

To assemble safety bar 24 in position, it is moved upwardly into the bracket through the open bottom thereof and displaced longitudinally in any direction so that one set of tongues 29 is located outwardly of ribs 31 and the opposite set of tongues 29 is located inwardly of the corresponding set of ribs 31 within the inner end of pockets 30. Bar 24 is disposed upwardly to locate the tongues 29 above ribs 31 whereupon said bar is then moved longitudinally into proper position in the bracket in which position tongues 29 will engage and rest on ribs 31. Pin 25 can now be placed in position to tension spring 26 and lock the bar against longitudinal movement.

In the form shown in Figures 5 to 7, lateral projections formed on bar 24 are in the form of rollers 32 which are carried by the projecting ends of pins 27$^a$, said pins being used to hold the ends of spring 26 in position in said bar. Ribs 31 which form tracks for rollers 32 are provided with yielding spring leaves 34 which are secured at their outer ends to ribs 31 and have their inner ends extending upwardly for engagement with the peripheral faces of rollers 32 at points close to the horizontal axis of said rollers, thereby locking said rollers against movement and preventing accidental displacement of the bar. The assembling of the bar is the same as in the preceding form and in assembling the bar, one set of rollers 32 will ride over and depress the corresponding springs 34, which, as soon as said rollers pass, the free ends of said springs will move upwardly in the path of movement of the rollers. To remove the bar from position, one set of springs 32 has to be depressed by the insertion of a suitable tool between said springs and the corresponding rollers in order to permit the outward movement of the latter.

In the form shown in Figures 8 to 10, the bracket 18$^a$ is secured to a spring plank 10$^a$ consisting of a pair of members 35 diagonally disposed and secured together at the centrally disposed intersecting point by a rivet or other suitable fastening device 35$^a$. Brackets 18$^a$ are secured near their ends to the respective members 35 by rivets 36. A spacer plate 37 is interposed between the upper member 35$^b$ and the respective top of each bracket in order to maintain said bracket in proper horizontal position without the necessity of offsetting member 35$^b$.

In the form shown in Figures 11 and 12, a bracket 38 has portions 39 struck out laterally from its edges and turned inwardly to engage and support portions 40, which are struck laterally and outwardly from the flanges of safety bar or support 41.

The horizontally disposed web portion of channel or bar 41 is provided with elongated openings 42 to provide clearance for the heads of rivets 43, which latter are used to secure bracket 38 to the spring plank.

By means of my improved construction, the assembling and disassembling of the safety bar is facilitated and additional supports are provided for the safety bar.

I claim:

1. In a safety guard for brake beams, a bracket open at the bottom, a brake beam safety bar insertable in said bracket from below and having laterally and outwardly projecting portions adapted to enter into interlocking engagement with said bracket.

2. In a safety guard for brake beams, a bracket open at the bottom, a brake beam safety bar insertable in said bracket from below, and laterally projecting means on said bar engageable by said bracket to support said bar therein.

3. In a safety guard for brake beams, a bracket open at the bottom, a brake beam safety bar insertable in said bracket from below, and lateral projections on said bar adapted to be seated in said bracket and support said bar in position.

4. In a safety guard for brake beams, a bracket open at a bottom, a brake beam safety bar adapted to be inserted in said bracket from below, and cooperating lateral projections on said bar and said bracket for interengaging said bar with said bracket.

5. In a safety guard for brake beams, a bracket having spaced side walls provided with horizontally disposed seats, and a brake beam safety bar having outwardly and laterally projecting portions adapted to engage said seats and support said bar in position.

6. In a safety guard for brake beams, a bracket having spaced side walls provided with horizontally disposed seats, a brake beam safety bar having outwardly and laterally projecting portions adapted to engage said seats and support said bar in position, and means for locking said bar against removal from said bracket.

7. In a safety guard for brake beams, a bracket adapted to be secured to a truck part and having spaced side walls opening downwardly, laterally projecting members carried by said walls, a brake beam safety bar insertable in said bracket from below, and members carried by said bar and adapted to engage said projecting members of said bracket and support said bar in position.

8. In a car construction, a bracket open at the bottom and provided with inwardly presented portions, a brake beam safety bar provided with lateral portions adapted to engage said portions and hold said bar in position in said bracket.

9. In a car construction, a supporting member adapted to be secured to a car truck part and provided with inwardly projecting portions, a brake beam safety bar provided with laterally projecting portions adapted to be engaged by said portions of said supporting member.

10. In a car construction, the combination with a bracket, of a brake beam safety bar provided with laterally projecting oppositely disposed portions adapted to engage said bracket and support said bar in position.

11. In a car construction, the combination with a bracket, of a brake beam safety bar provided with laterally projecting oppositely disposed portions adapted to engage said bracket and support said bar in position, and means for locking said bar in supporting position in said bracket.

12. In a car construction, the combination with a bracket, of a brake beam safety bar provided with laterally projecting oppositely disposed portions adapted to engage said bracket and support said bar in position, and displaceable means for engaging projections on said bar and locking the latter against displacement.

13. In a brake beam support, a bracket for attachment to a truck part, a support member movable upwardly from below into said bracket, and means on said bracket and member adapted to be vertically interengaged when said member is moved horizontally after such vertical movement.

14. In a brake beam support, a bracket for attachment to a truck part, a support member movable upwardly from below into said bracket, means on said bracket and member adapted to be vertically interengaged when said member is moved horizontally after such vertical movement, and means for locking said bracket and member in assembled position after such horizontal movement.

15. In a brake support, a bracket for attachment to a truck part and including depending sides with relatively short inwardly extending seats, and a support member having relatively short lateral flanges, said member being adapted to be lifted into said bracket when said flanges are disaligned with said seats and said member being adapted to then be shifted so as to rest its flanges on said seats.

In testimony whereof I hereunto affix my signature this 12th day of October, 1925.

EDWIN G. BUSSE.